United States Patent
Ihl et al.

(10) Patent No.: US 8,406,438 B2
(45) Date of Patent: Mar. 26, 2013

(54) DEVICE AND METHOD FOR THE EXCITATION AND/OR DAMPING AND/OR DETECTION OR STRUCTURAL OSCILLATIONS OF A PLATE-SHAPED DEVICE USING A PIEZOELECTRIC STRIP DEVICE

(75) Inventors: Wilfried Ihl, Leingarten (DE); Arpad Szoelloesi, Debrecen (HU); Istvan Denes, Waiblinge/Hohenacker (DE)

(73) Assignee: Robert Bosch GmbH, Stuttgart (DE)

( * ) Notice: Subject to any disclaimer, the term of this patent is extended or adjusted under 35 U.S.C. 154(b) by 321 days.

(21) Appl. No.: 12/738,681

(22) PCT Filed: Nov. 12, 2008

(86) PCT No.: PCT/EP2008/065356
§ 371 (c)(1),
(2), (4) Date: Apr. 19, 2010

(87) PCT Pub. No.: WO2009/118059
PCT Pub. Date: Oct. 1, 2009

(65) Prior Publication Data
US 2010/0246862 A1 Sep. 30, 2010

(30) Foreign Application Priority Data
Mar. 26, 2008 (DE) .......................... 10 2008 000 816

(51) Int. Cl.
*H04R 9/18* (2006.01)
*H04R 9/06* (2006.01)
*F16F 15/02* (2006.01)
*H01L 41/08* (2006.01)
*H01L 41/083* (2006.01)
*H04R 9/00* (2006.01)
*F16F 15/00* (2006.01)
*H01L 41/00* (2006.01)

(52) U.S. Cl. ......... 381/190; 181/209; 310/322; 310/326
(58) Field of Classification Search .................. 381/190, 381/173, 114; 181/207, 209; 310/322, 326, 310/332, 331, 367
See application file for complete search history.

(56) References Cited

U.S. PATENT DOCUMENTS
682,104 A * 9/1901 Middleton ...................... 248/617
3,107,905 A * 10/1963 Lucas ............................ 267/161
(Continued)

FOREIGN PATENT DOCUMENTS
CN 101036245 9/2007
DE 140946 A * 4/1980
(Continued)

Primary Examiner — Edgardo San Martin
(74) Attorney, Agent, or Firm — Michael J. Striker

(57) ABSTRACT

An apparatus and a method for the excitation and/or damping and/or detection of structural oscillations of a plate-shaped device by means of a piezoelectric strip device are described. The apparatus comprises a carrier device (1), at a distance from which the plate-shaped device (10; 10a) is disposed by way of a space (11), wherein the piezoelectric strip device (2; 2a, 2b; 2a', 2b',2c; 2d, 2e, 2f; 2'; 2g, 2h; 2i, 2j; 2k, 2l, 2m; 2n) includes a plurality of piezoelectric strip elements (2; 2a, 2b; 2a', 2b',2c; 2d, 2e, 2f; 2'; 2g, 2h; 2i, 2j; 2k, 2l, 2m; 2n), which each are connected to the carrier device (1) and to the plate-shaped device (10; 10a), wherein the strips (2; 2a, 2b; 2a', 2b',2c; 2d, 2e, 2f; 2'; 2g, 2h; 2i, 2j; 2k, 2l, 2m; 2n) can be excited into longitudinal changes, thereby causing the excitation and/or damping and/or detection of structural oscillations of the plate-shaped device (10; 10a), and wherein the piezoelectric strips (2; 2a, 2b; 2a', 2b',2c; 2d, 2e, 2f; 2'; 2g, 2h; 2i, 2j; 2k, 2l, 2m; 2n) are configured and connected to the plate-shaped device (10; 10a) such that the transmission of oscillations takes place in a substantially punctiform manner.

5 Claims, 7 Drawing Sheets

U.S. PATENT DOCUMENTS

| | | | |
|---|---|---|---|
| 3,676,722 A * | 7/1972 | Schafft | 310/332 |
| 3,816,774 A * | 6/1974 | Ohnuki et al. | 310/332 |
| 4,028,566 A * | 6/1977 | Franssen et al. | 310/358 |
| 4,056,742 A * | 11/1977 | Tibbetts | 310/357 |
| 4,284,921 A * | 8/1981 | Lemonon et al. | 310/328 |
| 4,683,396 A | 7/1987 | Takeuchi et al. | |
| 4,833,659 A | 5/1989 | Geil et al. | |
| 4,857,887 A * | 8/1989 | Iten | 341/34 |
| 5,130,948 A * | 7/1992 | Laukien et al. | 367/1 |
| 5,471,721 A * | 12/1995 | Haertling | 29/25.35 |
| 5,477,098 A * | 12/1995 | Eguchi et al. | 310/313 R |
| 5,598,050 A * | 1/1997 | Bowen et al. | 310/322 |
| 5,616,981 A * | 4/1997 | Nagano et al. | 310/326 |
| 6,069,433 A | 5/2000 | Lazarus et al. | |
| 6,386,317 B1 * | 5/2002 | Morohoshi et al. | 181/252 |
| 6,411,015 B1 * | 6/2002 | Toda | 310/334 |
| 6,438,242 B1 * | 8/2002 | Howarth | 381/190 |
| 6,484,845 B1 * | 11/2002 | Schleicher et al. | 181/207 |
| 6,700,304 B1 * | 3/2004 | Fuller et al. | 310/321 |
| 6,791,098 B2 * | 9/2004 | Pletner et al. | 250/548 |
| 7,161,276 B2 * | 1/2007 | Face | 310/314 |
| 7,166,952 B2 * | 1/2007 | Topliss et al. | 310/330 |
| 7,180,225 B2 * | 2/2007 | Sashida et al. | 310/330 |
| 7,717,228 B2 * | 5/2010 | Boock | 181/208 |
| 7,732,999 B2 * | 6/2010 | Clausen et al. | 310/369 |
| 7,854,295 B2 * | 12/2010 | Kakuhari | 181/206 |
| 2001/0026626 A1 * | 10/2001 | Athanas | 381/190 |
| 2010/0079039 A1 * | 4/2010 | Lampenscherf et al. | 310/367 |

FOREIGN PATENT DOCUMENTS

| | | |
|---|---|---|
| DE | 3330471 A1 * | 3/1985 |
| DE | 198 53 667 | 5/2000 |
| DE | 10 2007 012 925 | 9/2008 |
| EP | 602535 A2 * | 6/1994 |
| EP | 0 964 181 | 12/1999 |

* cited by examiner

DEVICE AND METHOD FOR THE EXCITATION AND/OR DAMPING AND/OR DETECTION OR STRUCTURAL OSCILLATIONS OF A PLATE-SHAPED DEVICE USING A PIEZOELECTRIC STRIP DEVICE

BACKGROUND INFORMATION

The present invention relates to a device an a method for the excitation and/or damping and/or detection of vibrations of a plate-shaped device using a piezoelectric strip device.

Although it may be applied to any system, the present invention and the fundamental problems it addresses will be explained with reference to systems that include a glass plate or a plastic plate or a printed circuit board as the plate-shaped device.

The older German patent application DE 10 2007 012 925 describes a method and a device for damping structural vibrations of a carrier device using a piezoelectric actuator device. The piezoelectric actuator device includes a strip, which may be piezoelectrically excited to generate longitudinal and/or transverse vibrations that dampen the structural vibrations, that includes a first end region and a second end region, and that is connected at least at either the first end region or a second end region to a surface of the carrier device in such a manner that the longitudinal and/or transverse vibrations may be transmitted to the carrier device. The dimensions of the strip are therefore substantially smaller than those of the carrier device, and so the vibrations are transmitted in a substantially punctiform manner.

FIG. 13 shows a device for damping structural vibrations of a carrier device using a piezoelectric actuator device according to the older German patent application DE 10 2007 012 925.

In FIG. 13, a carrier device is labeled using reference numeral 1. A piezoelectric actuator device in the form of a strip 2, which is piezoelectrically excitable to generate longitudinal and/or transverse vibrations that damp the structural vibrations, is installed on surface OF of carrier device 1. Strip 2 includes a first end region E1 and a second end region E2. First end region E1 is connected via bonding in region 3a to surface OF of the carrier device, and second end region E2 is connected via bonding in region 3b to surface OF of carrier device 1. The connection of strip 2 to surface OF is not limited to the strip-shaped bonding that is shown, however.

Strip 2 extends such that it arches above surface OF, thereby spanning a cavity 6 in the manner of a bridge. An additional mass device 5 is installed in the middle of the side of strip 2 that faces away from surface OF. The purpose of mass device 5 is to produce a reaction force to dampen the structural vibrations. Strip 2 is multilayered in design. In the middle thereof, a piezoelectric ceramic layer 20 is located, which may be electrically activated using electrode layers 21 which are adjacent thereto. An epoxy resin layer 21 and a polyimide layer 22 are located on and under the electrode layers. Electrode layers 21 are electrically connected via a connection device, which is not depicted, in order to couple the vibrations, which extend in the longitudinal and/or transverse direction of strip 2, into strip 2.

If only longitudinal vibrations are coupled into piezoelectrically excitable strip 2, as in the present example, this results—due to the geometric configuration—in a vibration mode S1, in which mass device 5 is deflected downwardly and upwardly, perpendicular to surface OF along the double arrow shown in FIG. 13.

Although this is not shown in the figure, strip 2 has a substantially smaller extension than carrier device 1, e.g., the size of strip 2 is in the range of 1-2 cm long×0.5 cm wide, and the size of carrier device 1 is in the range of 10-20 cm long× 5-10 cm wide.

ADVANTAGES OF THE INVENTION

The device according to the present invention and as recited in claim 1, and the method according to the present invention and as recited in claim 14 have the advantage that they create a new family of loudspeaker devices, sound absorbing devices, and vibration sensor devices or vibration isolation devices which may be used, e.g., on transparent surfaces as needed. Very broad applications are possible, in particular applications in motor vehicles, electronics, and mechanical constructions.

The features referred to in the dependent claims relate to advantageous developments and improvements of the subject matter of the present invention.

According to a preferred development, the piezoelectric strip elements include a group of one or more piezoelectric strip elements that have a first end and a second end that are connected to the carrier device, and that include a middle region that is connected to the plate-shaped device and is arched, thereby forming a cavity that faces the carrier device. Other geometries may also be used, in particular a series or parallel connection of the strip elements or a configuration as a continuous strip that includes a plurality of interlinked strip elements.

According to a further preferred development, a guide plate, which is connected to the carrier device, is located above the strip element, includes an opening above the middle region of the strip element, and is designed such that it prevents an edge region of the strip element from becoming displaced relative to the carrier device. It is therefore possible to attain large displacements using long strip elements.

According to a further preferred development, the guide plate has an electrode function for the strip element. In addition, dissipation heat that is produced during the piezoactivity may be directed away via the guide plate.

According to a further preferred development, the device is designed to excite structural vibrations of the plate-shaped device, and it includes a loudspeaker function.

According to a further preferred development, the plate-shaped device is a cover of a mobile electronic device, in particular a portable computer.

DRAWING

An embodiment of the present invention is presented in the drawing and is described in greater detail in the description that follows.

FIGS. 1a-c show a schematic depiction of a device for the excitation and/or damping and/or detection of structural vibrations of a plate-shaped device using a piezoelectric strip device according to a first embodiment of the present invention; FIG. 1a shows a top view; FIG. 1b shows a sectional view along line A-A' in FIG. 1a, and FIG. 1c shows an enlarged view across section A1 in FIG. 1a;

Figure 1A:
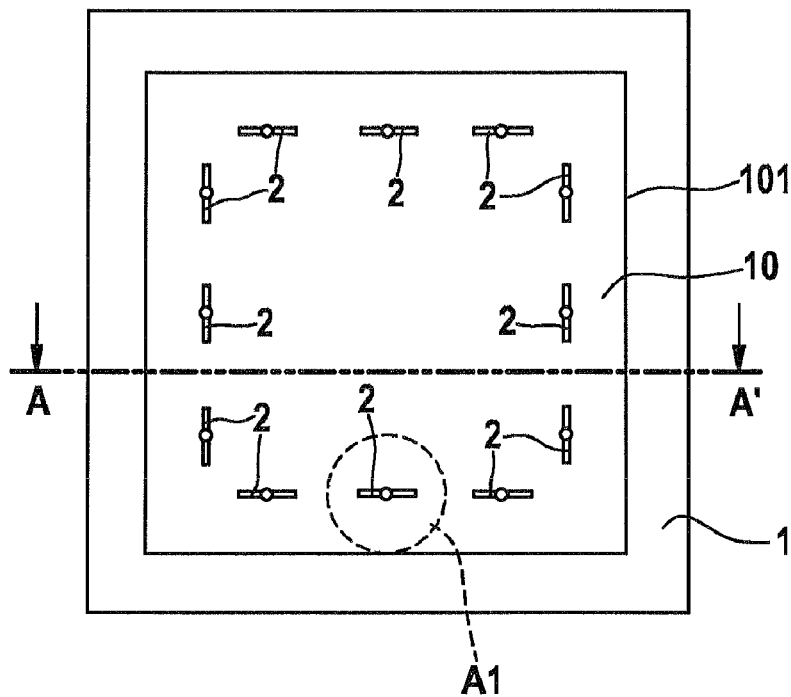
Figure 1B:
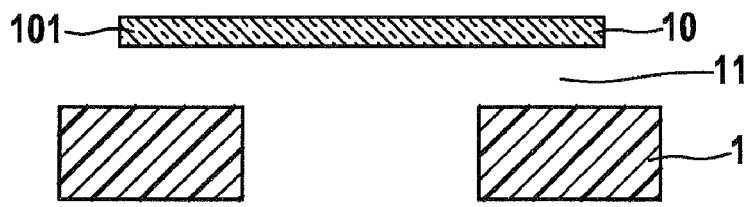
Figure 1C:
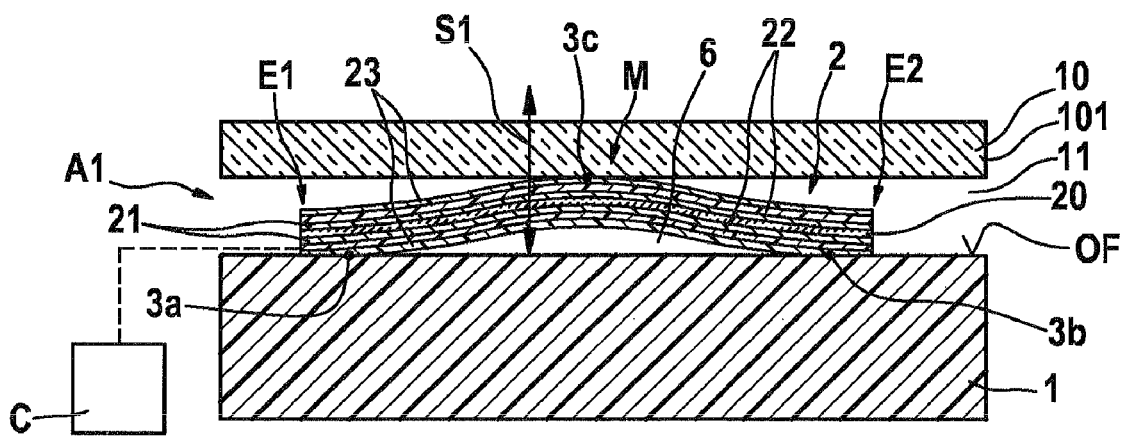
Figure 12:
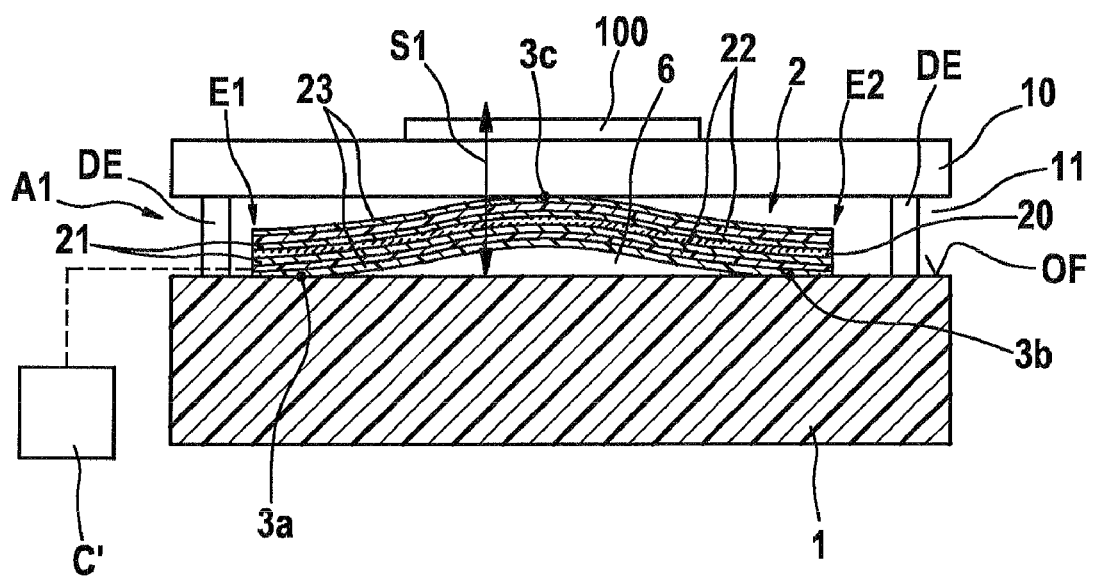
Figure 13:
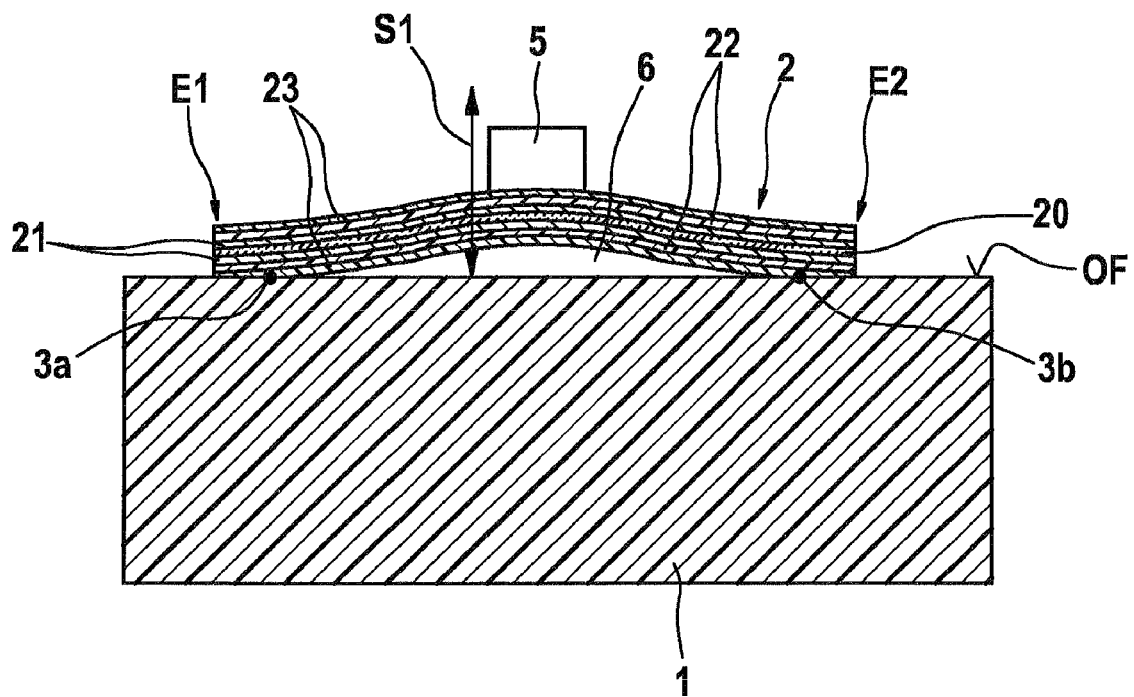

FIG. 12 shows a schematic depiction of a device for the excitation and/or damping and/or detection of structural vibrations of a plate-shaped device using a piezoelectric strip device according to a tenth embodiment of the present invention, in a sectional view that is analogous to FIG. 1c; and FIG. 13 shows a device for damping structural vibrations of a carrier device using a piezoelectric actuator device according to the older German patent application DE 10 2007 012 925.

DESCRIPTION OF EMBODIMENTS

In the figures, the same reference numerals are used to label elements that are the same or that perform the same function.

FIGS. 1a-c show a schematic depiction of a device for the excitation and/or damping and/or detection of structural vibrations of a plate-shaped device using a piezoelectric strip device according to a first embodiment of the present invention; FIG. 1a shows a top view; FIG. 1b shows a sectional view along line A-A' in FIG. 1a, and FIG. 1c shows an enlarged view across section A1 in FIG. 1a.

In FIGS. 1a-c, a carrier device in the form of a metal or plastic frame is labeled using reference numeral 1. A plate-shaped device 10 in the form of a glass plate is installed over a piezoelectric strip device 2 at a distance from carrier device 1, separated by an intermediate space 11. Piezoelectric strip device 2 includes a plurality of piezoelectric strips 2 that are connected to carrier device 1 and to plate-shaped device 10.

The dimensions of strips 2 are substantially smaller than those of carrier device 1 and plate-shaped device 10, and so the coupling of strips 2 is considered to be substantially punctiform.

In the configuration shown in FIGS. 1a-c, twelve strips 2 are located along and parallel to periphery 101 of plate-shaped device 10. The dots shown in FIG. 1a indicate the points at which upper middle region M of strips 2 are coupled to plate-shaped device 10. The lines drawn through the dots represent the longitudinal placement of strips 2 relative to carrier device 1.

As shown in FIG. 1c, every piezoelectric strip 2 is connected at a first end region E1 and a second end region E2 in regions 3a and 3b, respectively, to surface OF of carrier device 1, e.g., via bonding. The top side of piezoelectric strip 2 is connected via its upper middle region M in region 3c to the underside of plate-shaped device 10, e.g., via bonding. Strips 2 extend such that they arch above surface OF, thereby spanning a cavity 6 in the manner of a bridge.

Strips 2 are multilayered in design. In the middle thereof, a piezoelectric ceramic layer 20 is located, which may be electrically activated using electrode layers 21 which are adjacent thereto. An epoxy resin layer 22 (or a thermoplastic layer) and a polyimide layer 23 are located on and under electrode layers 21. Electrode layers 21 are electrically connected via a connection device (which is not shown) to a control device C.

Via control device C, it is basically possible to provide three different functionalities, in combinations, if necessary. The first functionality is an excitation of structural vibrations of plate-shaped device 10 using piezoelectric strip 2 (loudspeaker operation). The second functionality is a damping of structural vibrations of plate-shaped device 10 using piezoelectric strip 2 (vibration decoupling operation). The third functionality is a detection of structural vibrations in plate-shaped device 10 using piezoelectric strip device 2 (sensor operation).

Which of the functionalities is realized in a special device depends on the specific application.

The basic principle of creating/damping/generating structural vibrations in plate-shaped device 10 lies in the change in length of piezoelectric strips 2, which causes a movement in the direction of arrow S1 perpendicular to surface OF of carrier device 1, and therefore a related deflection of the coupling points of plate-shaped device 10. The deformation of plate-shaped device 10 results in solid-translational vibrations and, to a lesser extent, to undesired bending vibrations. To generate the desired solid-translational vibrations, the ratio thickness/(width×length) of plate-shaped device 10 should be selected accordingly. These vibrations produce compression waves in the surrounding medium, e.g., in air. If plate-shaped device 10 is a glass surface, as in the current example, it may be used to realize a transparent window loudspeaker.

Figure 2:
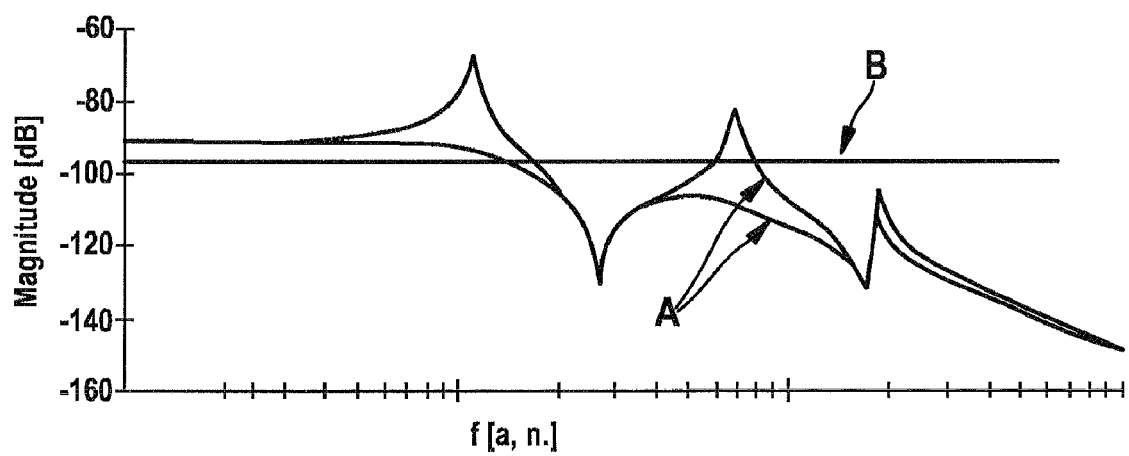
FIG. 2 shows a Bode plot which is used to illustrate the frequency behavior of the device according to FIGS. 1a-c.

FIG. 2 shows a Bode plot which is used to explain the frequency behavior of the device according to FIGS. 1a-c.

Curve B in FIG. 2 shows transmission characteristics A of a device according to FIGS. 1a-c in loudspeaker operation. In contrast, curves A show transmission characteristics of known loudspeakers having column-shaped piezoactuators, in which Eigen modes of the bending frequencies play a main role and result in nonuniform frequency characteristics, which is undesired for loudspeakers.

However, curve B of the device according to the present invention and depicted in FIGS. 1a-c has a nearly ideal, flat frequency characteristic that makes it possible to transmit every frequency component of the signal uniformly within the bandwidth of the loudspeaker. In other words, the bending vibrations are not noticeable when plate-shaped device 10 has a suitable stiffness.

Since plate-shaped device 10 has a large reflection surface, the transmitted sound has a higher quality than a punctiform loudspeaker. The actuator component of the loudspeaker in the form of strips 2 is not visible and does not limit the transparency if plate-shaped device 10 is composed of a transparent material. The actuator component of the loudspeaker is lightweight and contains no magnetic conductor materials, nor does it contain a winding, as an electrodynamic actuator. The actuator component of the loudspeaker requires very little installation space and may be installed entirely within the enclosing frame or carrier. The installation height is typically in the range of 2 to 3 mm. Due to it structure, this type of loudspeaker is very robust, and although the actuator device contains elements that have an assembled structure, it does not contain elements that slide on top of one another.

The positions of piezoelectric strips 2 should be defined with consideration for natural vibration modes of plate-shaped device 10.

Figure 3A:
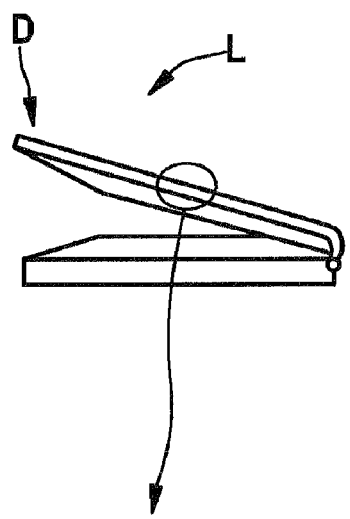
FIG. 3 shows an embodiment of a device according to FIGS. 1a-c.
Figure 3B:
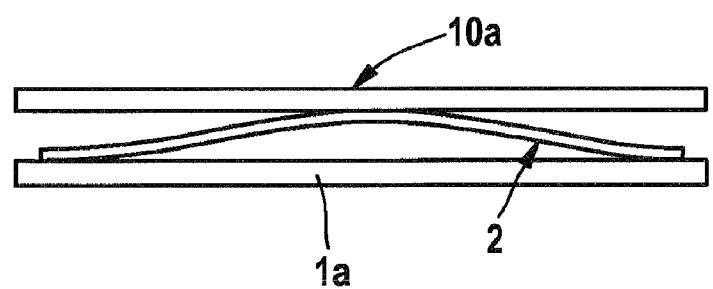

FIG. 3 shows an embodiment of the device according to FIGS. 1a-c.

FIG. 3a shows a laptop L that includes a cover D. Reference numeral 1a labels an LCD display of cover D which corresponds to the carrier device. Reference numeral 10a labels the back-side cover plate of cover D which corresponds to plate-shaped device 10 depicted in FIGS. 1a-c. Reference numeral 2 labels one of a plurality of piezoelectric strips 2 that are installed between LCD display 1 and back-side cover plate 10a, e.g., in a configuration as shown in FIG. 1a. Using this configuration, it is possible to design rear-side cover 10a of cover D of laptop L as a base speaker. Via this feature, it is possible to increase the low-frequency components of the sound emitted by a laptop or similar computers, which the known installed loudspeakers of mobile electrical devices are typically unable to do.

In terms of the second functionality, i.e., damping operation, vibrations of plate-shaped device 10 that are detected may be damped accordingly by activating piezoelectric strips 2. This operation is advantageously associated with the sensor operation which detects vibrations of this type via deformation of piezoelectric strips 2. Individual strips 2 may therefore function as sensor elements or as actuator elements, in a time-dependent manner. However, it is also possible for a group of piezoelectric strips 2 to function exclusively as sensor elements, and for a further group to function exclusively as actuator elements. Sound absorbing applications are, e.g., air/space travel applications, and motor vehicle applications, e.g., absorbing wind noise on windshields, or isolating sound produced during flight in the walls of aircraft.

It is also possible to design a device that operates exclusively as a sensor, e.g., to monitor vibrations in buildings or vehicles.

Figure 4:
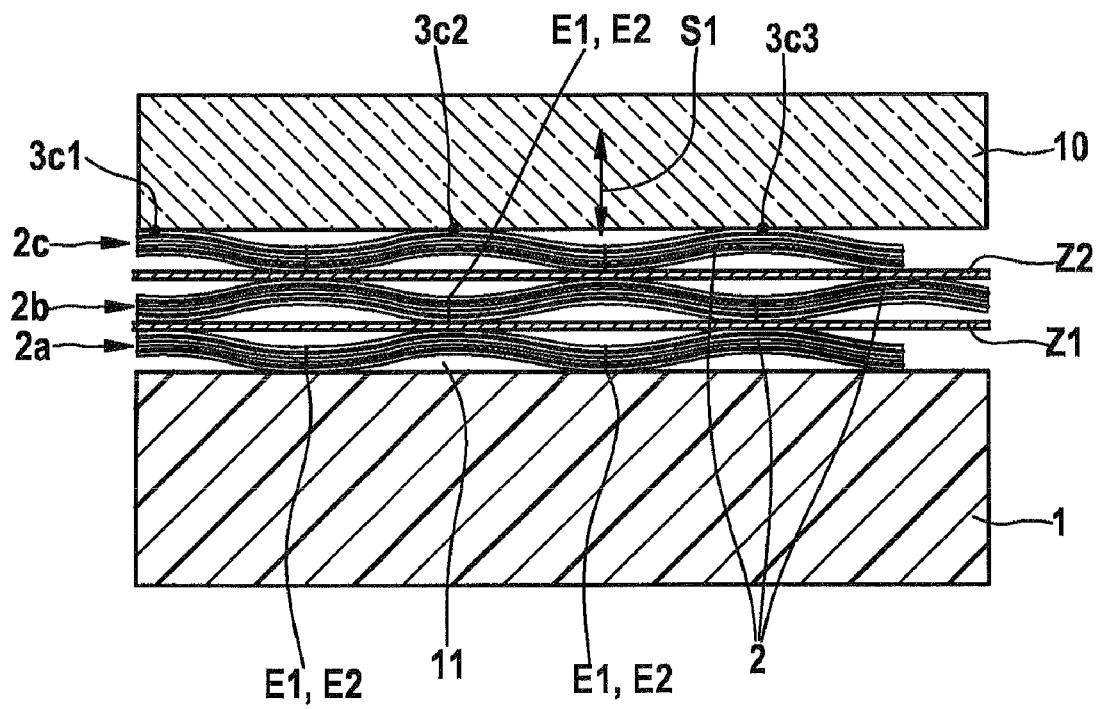
FIG. 4 shows a schematic depiction of a device for the excitation and/or damping and/or detection of structural vibrations of a plate-shaped device using a piezoelectric strip device according to a second embodiment of the present invention, in a sectional view that is analogous to FIG. 1c.

FIG. 4 is a schematic depiction of a device for the excitation and/or damping and/or detection of structural vibrations of a plate-shaped device using a piezoelectric strip device according to a second embodiment of the present invention, in a sectional view that is analogous to FIG. 1c.

In the embodiment shown in FIG. 4, the offset or displacement S1 at coupling points 3c1, 3c2, 3c3 of plate-shaped device 10 may be attained via the phase-opposed superposition of three piezoelectric strips 2a, 2b, 2c. To this end, a rigid intermediate plate Z1 and Z2 is situated between strips 2a, 2b and 2b, 2c, respectively. Strips 2a, 2b, 2c are continuous strips that are composed of a large number of strip segments 2 according to FIG. 1c. Ends E1, E2 of the segments of strip 2a are connected to carrier device 1, and middle regions M of segments 2 of strip device 2a are connected to first intermediate plate Z1. Ends E1, E2 of segments 2 of second strip device 2b are connected to first intermediate plate Z1, and middle regions M of segments 2 of second strip device 2b are connected to second intermediate plate Z2. Ends E1, E2 of elements 2 of third strip device 2c are connected to second intermediate plate Z2, and middle regions M of segments 2 of third strip device 2c are connected to plate-shaped device 10, i.e., at coupling points 3c1, 3c2, 3c3.

Particular ends E1, E2 of strip elements 2 of strip 2b are located above corresponding middle regions M of strip elements 2 of strip 2a. Particular ends E1, E2 of strip elements 2 of strip 2c are located above corresponding middle regions M of strip elements 2 of strip 2b. As a result, phase opposition is attained, which causes an increase in displacement.

For the rest, the design of strips 2a, 2b, 2c or segments 2 corresponds to the design described in conjunction with FIG. 1c.

Figure 5:
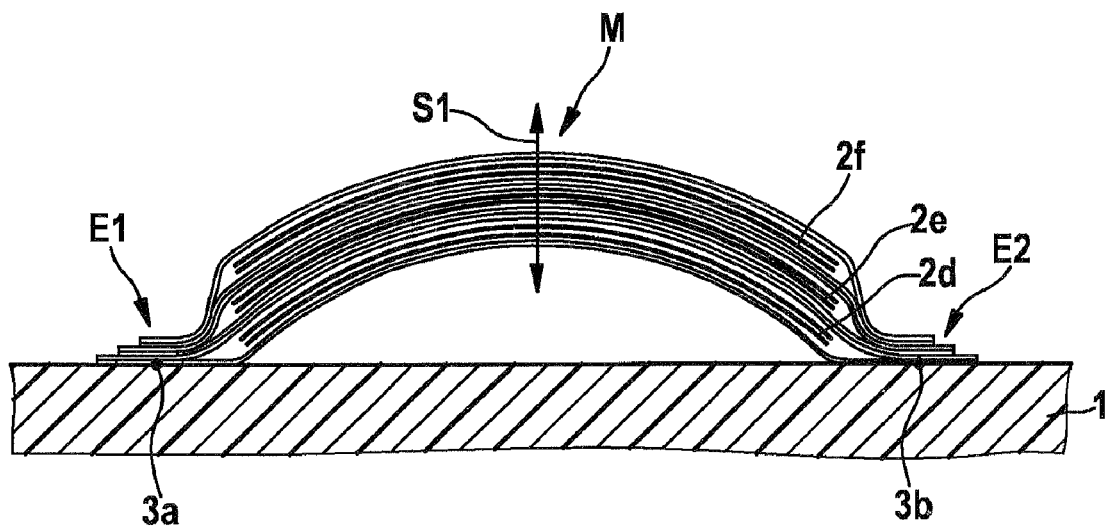
FIG. 5 shows a schematic depiction of a device for the excitation and/or damping and/or detection of structural vibrations of a plate-shaped device using a piezoelectric strip device according to a third embodiment of the present invention, in a sectional view that is analogous to FIG. 1c.

FIG. 5 is a schematic depiction of a device for the excitation and/or damping and/or detection of structural vibrations of a plate-shaped device using a piezoelectric strip device according to a third embodiment of the present invention, in a sectional view that is analogous to FIG. 1c.

In the embodiment presented in FIG. 5, the stiffness of middle region M of the strips is increased by connecting a plurality of strips 2d, 2e, 2f in parallel by interconnecting them at end regions E1 or E2, where they are also connected at points 3a, 3b to carrier device 1. The force of the actuator is also increased as a result.

Figure 6:
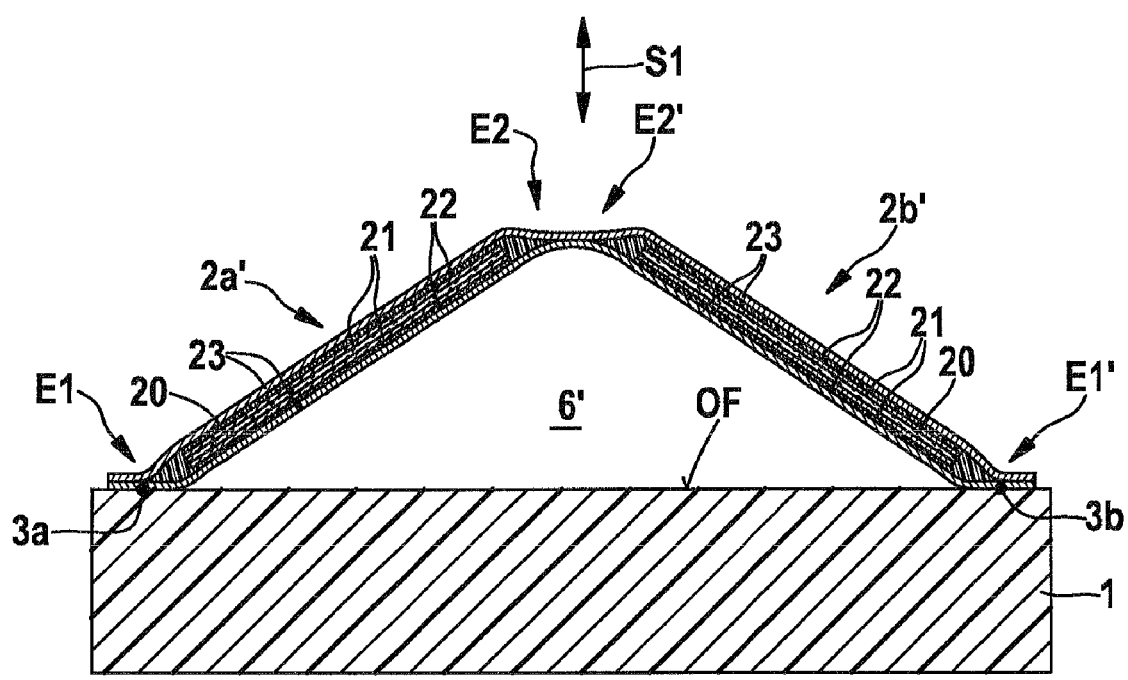
FIG. 6 shows a schematic depiction of a device for the excitation and/or damping and/or detection of structural vibrations of a plate-shaped device using a piezoelectric strip device according to a fourth embodiment of the present invention, in a sectional view that is analogous to FIG. 1c.

FIG. 6 is a schematic depiction of a device for the excitation and/or damping and/or detection of structural vibrations of a plate-shaped device using a piezoelectric strip device according to a fourth embodiment of the present invention, in a sectional view that is analogous to FIG. 1c.

In the fourth embodiment, as shown in FIG. 6, a first and second piezoelectric strip 2a', 2b' are provided, which substantially have the same design as piezoelectric strip 2 in the first embodiment. The only difference is that piezoelectric ceramic layer 20 and electrode layers 21 adjacent thereto do not extend to end regions E1, E2 or E1', E2', but rather terminate at a distance therefrom.

Figure 7:
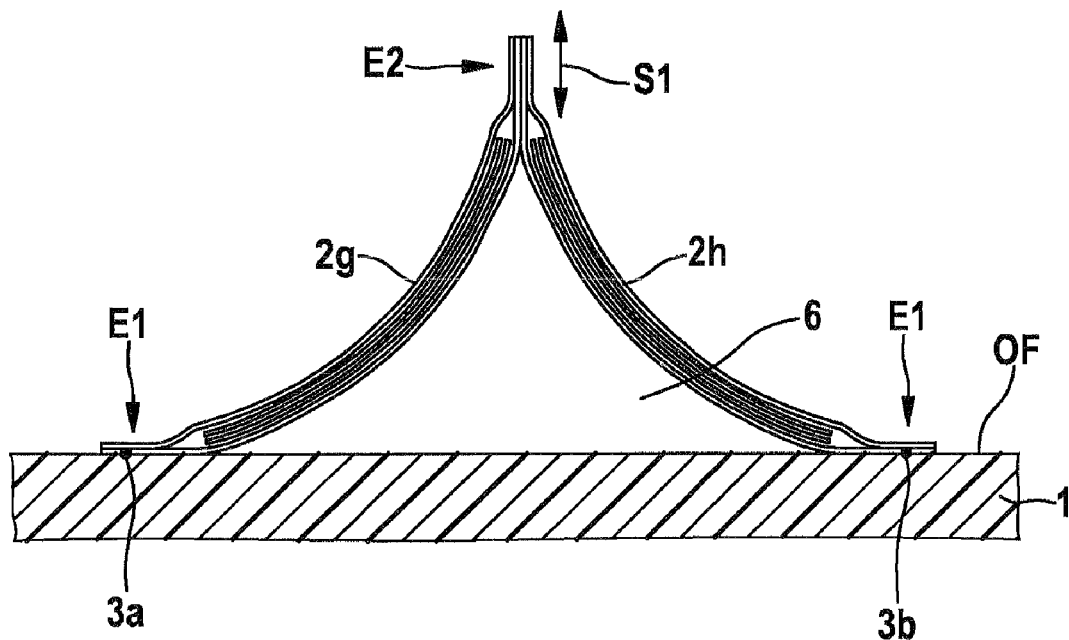
FIG. 7 shows a schematic depiction of a device for the excitation and/or damping and/or detection of structural vibrations of a plate-shaped device using a piezoelectric strip device according to a fifth embodiment of the present invention, in a sectional view that is analogous to FIG. 1c.

As shown in FIG. 7, first end region E1 of first strip 2a', and first end region E1' of second strip 2b' are connected (e.g., bonded) in regions 3a and 3b, respectively, to surface OF of carrier device 1. Second end region E2, E2' is connected to plate-shaped device 10 which is not depicted here. This design has the advantage that substantially stiffer, inflexible piezoceramics may be incorporated in the structure.

FIG. 7 is a schematic depiction of a device for the excitation and/or damping and/or detection of structural vibrations of a plate-shaped device using a piezoelectric strip device according to a fifth embodiment of the present invention, in a sectional view that is analogous to FIG. 1c.

In the embodiment depicted in FIG. 7, two curved piezoelectric strips 2g, 2h are connected at their first end E1 to the substrate at points 3a and 3b, while they are connected at their particular second end E2 to each other and to plate-shaped device 10 which is not shown here. This results in a decrease in the tension in strips 2g, 2h since the radius of curvature is greater.

Figure 8:
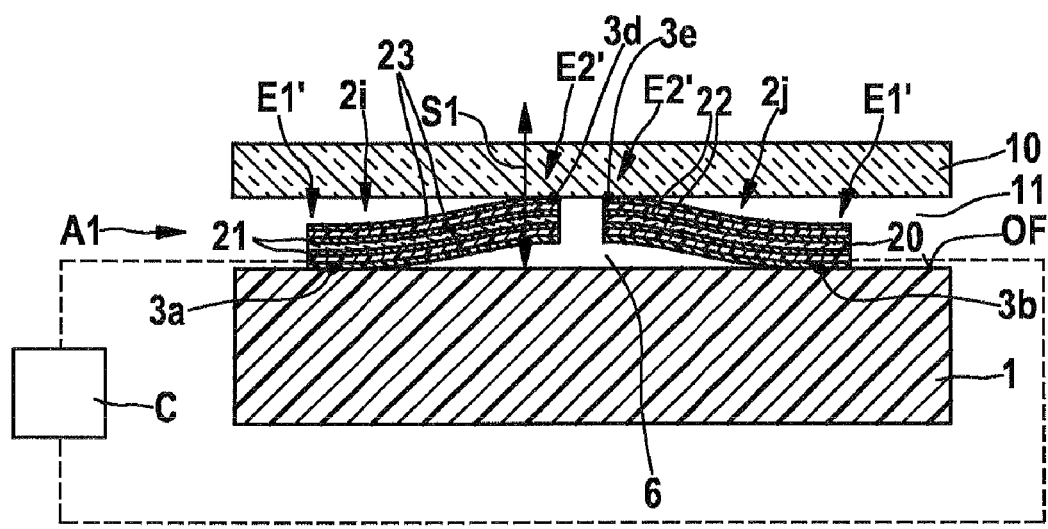
FIG. 8 shows a schematic depiction of a device for the excitation and/or damping and/or detection of structural vibrations of a plate-shaped device using a piezoelectric strip device according to a sixth embodiment of the present invention, in a sectional view that is analogous to FIG. 1c.

FIG. 8 is a schematic depiction of a device for the excitation and/or damping and/or detection of structural vibrations of a plate-shaped device using a piezoelectric strip device according to a sixth embodiment of the present invention, in a sectional view that is analogous to FIG. 1c.

In the embodiment depicted in FIG. 8, strip 2 according to FIG. 1c is divided into two strips 2i, 2j. Strips 2i, 2j have an S shape, one end E1' of which is connected at points 3a, 3b to carrier device 1, and the other end E2' of which is connected at points 3d or 3e to plate-shaped device 10. A design of this type likewise lowers the flexural load on the piezoelectric strips 2i, 2j. Piezoelectric strips 2i, 2j are activated by control device C in such a manner that horizontal force components are eliminated.

Figure 9:
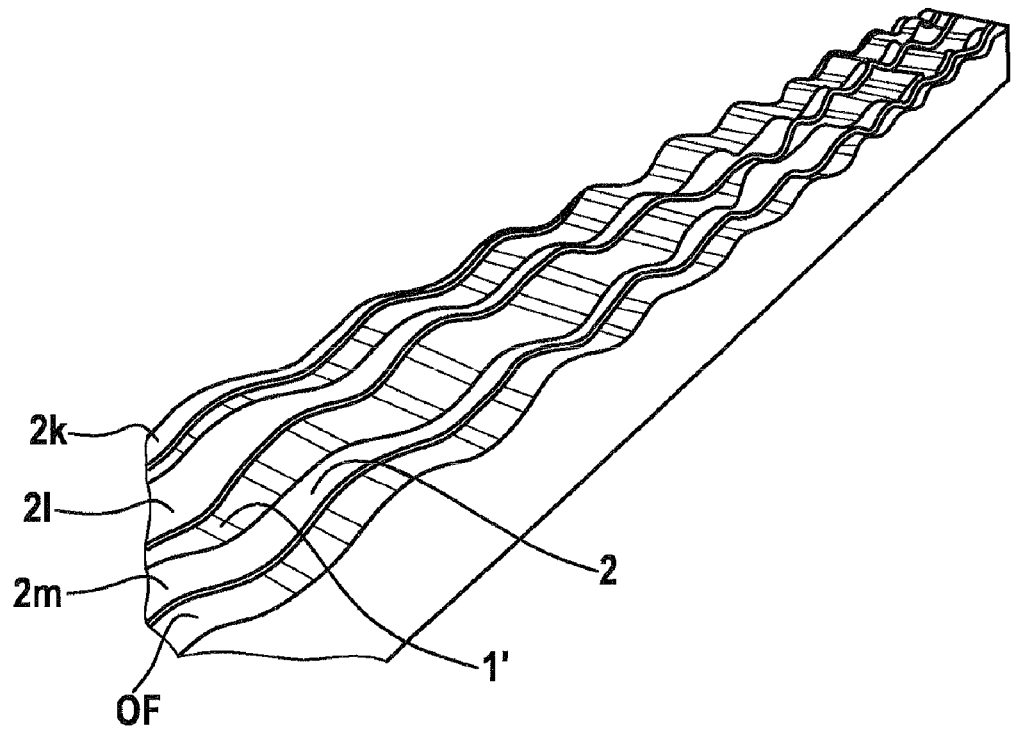
FIG. 9 shows a schematic depiction of a device for the excitation and/or damping and/or detection of structural vibrations of a plate-shaped device using a piezoelectric strip device according to a seventh embodiment of the present invention, in a sectional view that is analogous to FIG. 1c.

FIG. 9 is a schematic depiction of a device for the excitation and/or damping and/or detection of structural vibrations of a plate-shaped device using a piezoelectric strip device according to a seventh embodiment of the present invention, in a sectional view that is analogous to FIG. 1a.

In the embodiment depicted in FIG. 9, three continuous strips are bonded in parallel via a plurality of segments 2 located one after the other (see FIG. 4) to a surface OF of a carrier device 1'. Piezoelectric strips 2k, 2l have varying widths. They may exert different forces on plate-shaped device 10 (which is not depicted) at different locations. In this embodiment, piezoelectric strip 2m functions merely as a sensor, and may have a constant or variable width.

Not shown in the depiction presented in FIG. 9 is the coupling of plate-shaped device 10 which should be realized as indicated in FIG. 1c. Since the force of piezoelectric strips 2k, 2l, 2m that acts in the normal direction relative to surface OF is proportional to its width, it is possible in this embodiment to vary the force in the longitudinal direction of strips 2k, 2l, 2m, thereby making it possible to induce certain types of vibration of plate-shaped device 10.

Figure 10:
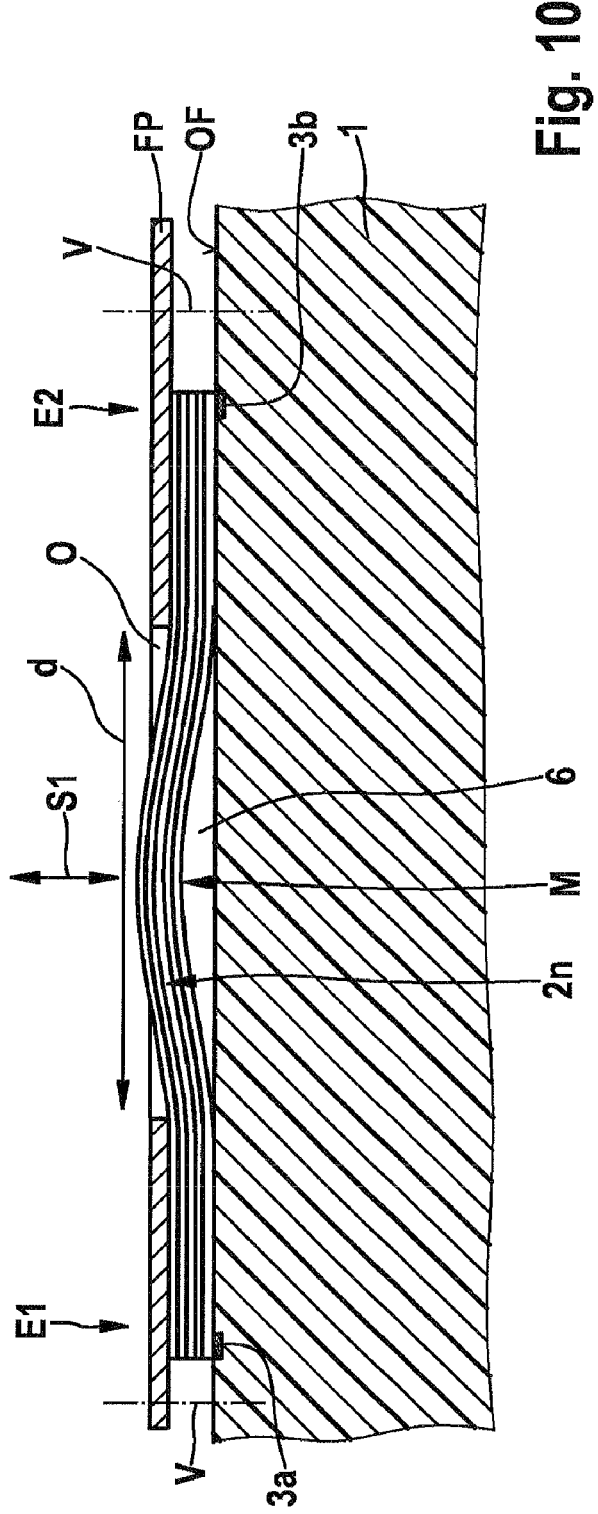
FIG. 10 shows a schematic depiction of a device for the excitation and/or damping and/or detection of structural vibrations of a plate-shaped device using a piezoelectric strip device according to an eighth embodiment of the present invention, in a sectional view that is analogous to FIG. 1c.

FIG. 10 is a schematic depiction of a device for the excitation and/or damping and/or detection of structural vibrations of a plate-shaped device using a piezoelectric strip device according to an eighth embodiment of the present invention, in a sectional view that is analogous to FIG. 1c.

In the embodiment depicted in FIG. 10, a long piezoelectric strip 2n is connected, e.g., bonded, at its ends E1, E2 in regions 3a and 3b to carrier device 1. Piezoelectric strip 2n is a longer piezoelectric strip than piezoelectric strip 2 depicted in FIG. 1c. A guide plate FP is provided above piezoelectric strip 2n, which includes an opening O that has a predetermined diameter d around middle region M of strip 2n. Strip 2n may move in the direction of arrow S1, which is perpendicular to surface OF of carrier device 1, only in this region of opening O having diameter d. This is not possible in the edge regions of strip 2n, i.e., in the contact region of guide plate FP, since guide plate FP holds strip 2n against surface OF of substrate 1. Given the longer length of strip 2n, strip 2n is capable of undergoing greater displacement than strip 2 since the change in length of strip 2n is proportional to its length. Due to the presence of guide plate FP, the displacement may be deliberately relocated to middle region M, and strip 2n is prevented from buckling outside of middle region M located within opening O. In addition, guide plate FP may be used as a heat sink for heat that is produced via the piezoelectrically induced motions. As indicated by dashed lines, guide plate FP is connected, e.g., to carrier device 1 via a mechanical connection device V. A connection device V of this type may be realized, e.g., using screws or bonding. In any case, connecting device V must ensure that guide plate FP may not move perpendicularly to surface OF of carrier device 1. A further possible function of guide plate FP is an electrode function for piezoelectric strip 2n. In this case, the corresponding insulations of strip 2n must be interrupted at suitable points.

Figure 11:
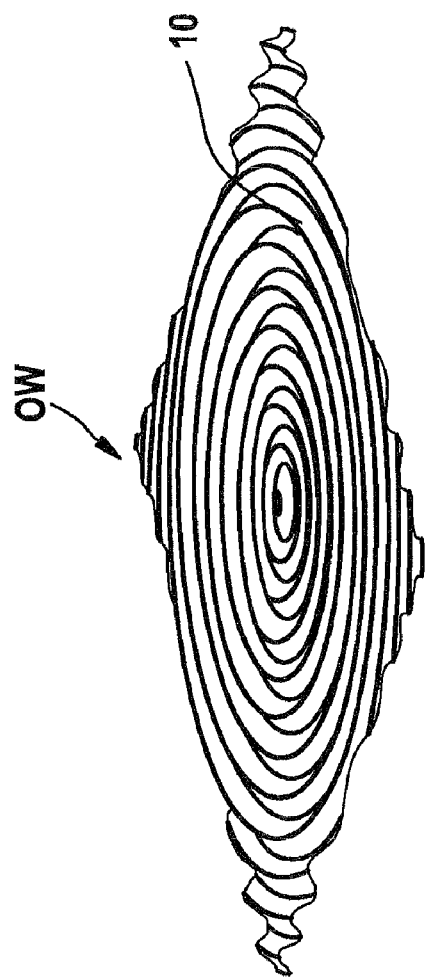
FIG. 11 shows a schematic depiction of a device for the excitation and/or damping and/or detection of structural vibrations of a plate-shaped device using a piezoelectric strip device according to a ninth embodiment of the present invention, in a sectional view that is analogous to FIG. 1c.

FIG. 11 shows a schematic depiction of a device for the excitation and/or damping and/or detection of structural vibrations of a plate-shaped device using a piezoelectric strip device according to a ninth embodiment of the present invention.

FIG. 11 shows a surface waveform OW of carrier device 10, which may be generated, e.g., by a device according to FIG. 10, if piezoelectric strips 2 are situated in concentric circles on carrier device 1, in which case the longitudinal extension of piezoelectric strips 2 extends radially.

FIG. 12 is a schematic depiction of a device for the excitation and/or damping and/or detection of structural vibrations of a plate-shaped device using a piezoelectric strip device according to a tenth embodiment of the present invention, in a sectional view that is analogous to FIG. 1c.

In the embodiment depicted in FIG. 12, in contrast to the embodiment explained with reference to FIG. 1c, plate-shaped device 10 is a printed circuit board on which an electronic element 100, which should be protected from vibrations, is mounted. To accomplish this, control device C depicted in FIG. 12 performs a vibration decoupling operation. Strip 2, which is depicted, and strips 2, which are not shown, are used as actuators. One or more strips 2, which are not shown, are used as sensors.

To support the decoupling of vibrations, an additional damping device DE, e.g., in the form of a related elastomer element, is provided between carrier device 1 and plate-shaped device 10. Damping device DE is in direct contact with carrier device 1 and plate-shaped device 10.

Although the present invention has been explained above with reference to preferred embodiments, it is not limited thereto, and may be realized in another manner.

Although certain geometries of the strip configuration and the arrangement of the strips relative to the plate-shaped device were illustrated with reference to the above-described embodiments, the present invention is not limited thereto, but rather may basically be depicted in any geometrical configuration. Likewise, the structure of the piezoelectric strips may deviate from the structure that is shown, e.g., it may include a plurality of piezoelectric ceramic layers having corresponding electrode layers.

Finally, the applications mentioned above are presented as examples only, and may be used, of course, on other plate-shaped devices, such as housing plates, reinforcement plates, etc.

What is claimed is:

1. A device for at least one of exciting, damping and detecting structural vibrations of a plate-shaped device (10; 10a) using a piezoelectric strip device, (2g, 2h), comprising:
   a carrier device (1), from which the plate-shaped device (10; 10a) is separated via an intermediate space (11);
   in which the piezoelectric strip device (2g, 2h) includes a plurality of piezoelectric strip elements (2g, 2h), each of which is connected to the carrier device (1) and the plate-shaped device (10; 10a);
   in which the strip elements (2g, 2h) are piezoelectrically excitable to undergo changes in length, thereby inducing the any of the exciting, the damping and the detecting of the structural vibrations of the plate-shaped device (10; 10a);
   in which the piezoelectric strip elements (2g, 2h) are configured and connected to the plate-shaped device (10; 10a) in such a manner that the vibrations are transmitted in a substantially punctiform manner;
   wherein the piezoelectric strip elements include a group of one or more piezoelectric strip elements (2g, 2h) that includes a plurality of series-connected strip elements (2g, 2h), in which a first end (E1) of a first strip element (2g) and a first end (E1) of a second strip element (2h)

are connected to the carrier device (1), and in which a second end (E2) of the first strip element (2g) and a second end (E2) of the second strip element (2h) are connected to one another and to the plate-shaped device (10; 10a), thereby spanning a cavity (6) in a manner of a bridge; and wherein the first strip element (2g) arches one part of the cavity (6) and the second strip element (2h) arches the other part of the cavity (6).

2. The device as recited in claim 1, in which the device is designed to excite structural vibrations of the plate-shaped device (10; 10a), and it includes a loudspeaker function.

3. The device as recited in claim 2, in which the plate-shaped device (10; 10a) is a cover of a mobile electronic device, in particular a portable computer.

4. The device as recited in claim 1, in which a damping device (DE) is located in the intermediate space (11) for damping vibrations of the plate-shaped device (10; 10a).

5. A method for any of exciting, damping and detecting structural vibrations of a plate-shaped device (10; 10a) using a piezoelectric strip device (2g, 2h) that connects the plate-shaped device (10; 10a) to a carrier device (1), from which the plate-shaped device (10; 10a) is separated via an intermediate space (11); in which the piezoelectric strip device (2g, 2h) includes a plurality of piezoelectric strip elements (2g, 2h), each of which is connected to the carrier device (1) and the plate-shaped device (10; 10a);

wherein the piezoelectric strip elements include a group of one or more piezoelectric strip elements (2g, 2h) that includes a plurality of series-connected strip elements (2g, 2h), in which a first end (E1) of a first strip element (2g) and a first end (E1) of a second strip element (2h) are connected to the carrier device (1), and in which a second end (E2) of the first strip element (2g) and a second end (E2) of the second strip element (2h) are connected to one another and to the plate-shaped device (10; 10a), thereby spanning a cavity (6) in a manner of a bridge;

wherein the first strip element (2g) arches one part of the cavity (6) and the second strip element (2h) arches the other part of the cavity (6);

wherein the piezoelectric strip elements (2; 2a, 2b; 2a', 2b', 2c; 2d, 2e, 2f; 2'; 2g, 2h; 2i, 2j; 2k, 2l, 2m; 2n) are configured and connected to the plate-shaped device (10; 10a) in such a manner that the vibrations are transmitted in a substantially punctiform manner; and wherein the piezoelectric strip elements (2; 2a, 2b; 2a', 2b', 2c; 2d, 2e, 2f; 2'; 2g, 2h; 2i, 2j; 2k, 2l, 2m; 2n) are piezoelectrically excited to undergo changes in length, thereby inducing the any of the exciting, the damping and the detecting of the structural vibrations of the plate-shaped device (10; 10a).

* * * * *